(12) United States Patent
Allen

(10) Patent No.: US 6,913,322 B1
(45) Date of Patent: Jul. 5, 2005

(54) LUG NUT RETENTION SYSTEM FOR A CHROME-PLATED WHEEL COVER

(75) Inventor: Kirk R. Allen, Waterford, MI (US)

(73) Assignee: Lacks Industries, Inc., Grand Rapids, MI (US)

( * ) Notice: Subject to any disclaimer, the term of this patent is extended or adjusted under 35 U.S.C. 154(b) by 564 days.

(21) Appl. No.: 09/522,023

(22) Filed: Mar. 9, 2000

(51) Int. Cl.$^7$ ................................................ B60B 7/14
(52) U.S. Cl. ........................... 301/37.371; 301/37.102; 301/37.372
(58) Field of Search .......................... 301/37.1, 37.37, 301/37.43, 108.1, 108.4

(56) References Cited

U.S. PATENT DOCUMENTS

| | | | |
|---|---|---|---|
| 2,031,092 A | | 2/1936 | Begg |
| 3,356,421 A | * | 12/1967 | Trevarrow, Jr. ...... 301/37.37 X |
| 4,123,111 A | | 10/1978 | Renz et al. |
| 4,133,583 A | | 1/1979 | Spisak |
| 4,217,003 A | | 8/1980 | Main |
| 4,240,670 A | | 12/1980 | Zorn et al. |
| 4,316,638 A | | 2/1982 | Spisak |
| 4,382,635 A | | 5/1983 | Brown et al. |
| 4,707,035 A | | 11/1987 | Kondo et al. |
| 4,842,339 A | | 6/1989 | Roulinson |
| 4,895,415 A | | 1/1990 | Stay et al. |
| 4,950,036 A | | 8/1990 | Patti |
| 4,998,780 A | | 3/1991 | Eshler et al. |
| 5,022,710 A | * | 6/1991 | Groppo ................... 301/37.37 |
| 5,071,197 A | | 12/1991 | Webster et al. |
| 5,163,739 A | | 11/1992 | Stanlake |
| 5,181,767 A | | 1/1993 | Hudgins et al. |
| 5,220,445 A | | 6/1993 | Takenaka et al. |
| 5,249,845 A | | 10/1993 | Dubost |
| 5,297,854 A | | 3/1994 | Nielsen et al. |
| 5,503,465 A | | 4/1996 | Price et al. |
| 5,520,445 A | | 5/1996 | Toth |
| 5,595,422 A | | 1/1997 | Ladouceur |
| 5,667,281 A | | 9/1997 | Ladouceur |
| 5,820,225 A | | 10/1998 | Ferriss et al. |
| 5,842,749 A | | 12/1998 | DiMarco |

FOREIGN PATENT DOCUMENTS

| | | | | |
|---|---|---|---|---|
| GB | 1308293 | * | 2/1973 | .............. 301/37.37 |
| JP | 63-87301 | * | 4/1988 | .............. 301/37.37 |
| JP | 63-287601 | * | 11/1988 | .............. 301/37.37 |

* cited by examiner

Primary Examiner—Russell D. Stormer
(74) Attorney, Agent, or Firm—VanOphem & VanOphem, P.C.

(57) ABSTRACT

A wheel cover retention system for a wheel having a plurality of lug studs extending through the wheel. The wheel cover includes a base having an outboard surface and an inboard surface opposite the outboard surface, and also having lug towers formed integrally therein and projecting inboard from the inboard surface. The wheel cover includes thermal isolator itegrally fixed coaxially and apically to each of the lug towers, each lug stud extending through each lug tower and each thermal isolator. A lug nut threads to each lug stud to fasten the wheel cover between the wheel and a shoulder on the lug nut. The thermal isolator thermally isolates the base of the wheel cover from heat transfer from a brake component through the lug stud and nut.

14 Claims, 3 Drawing Sheets

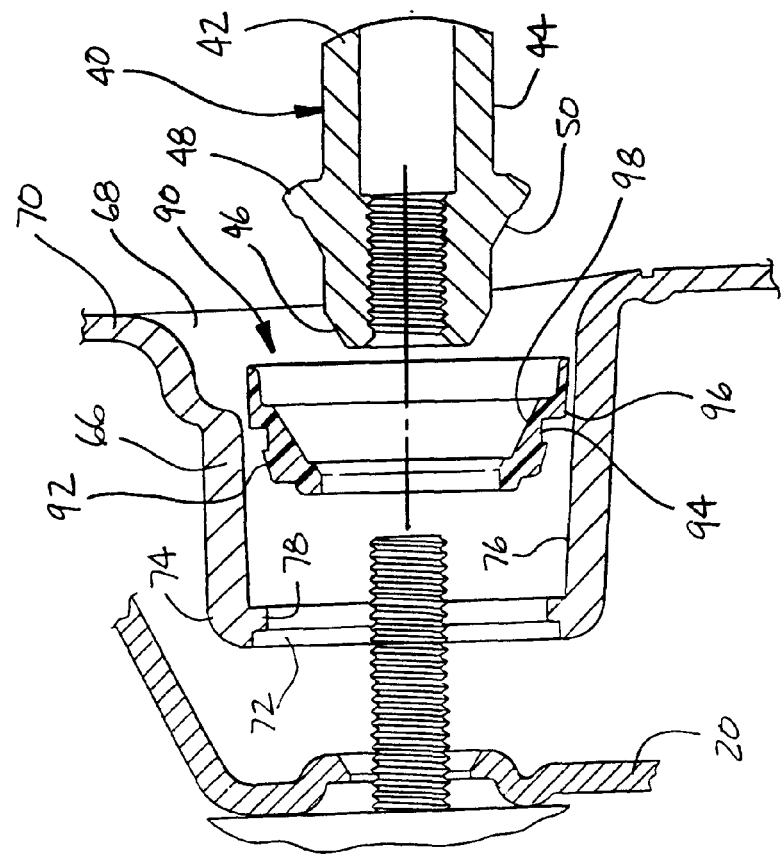
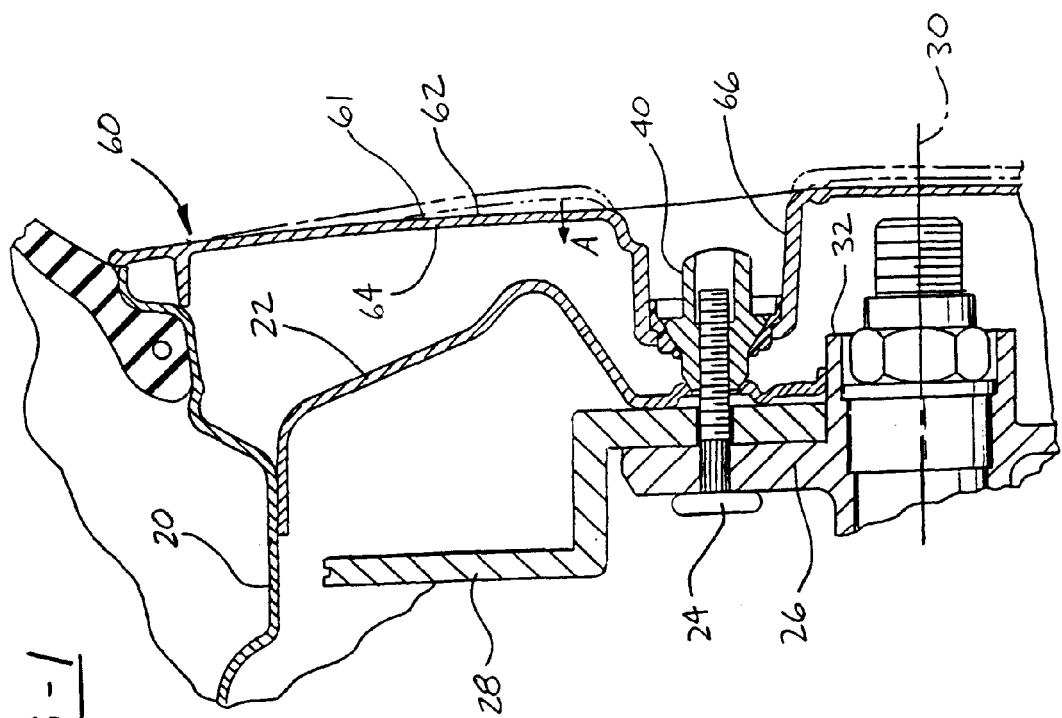

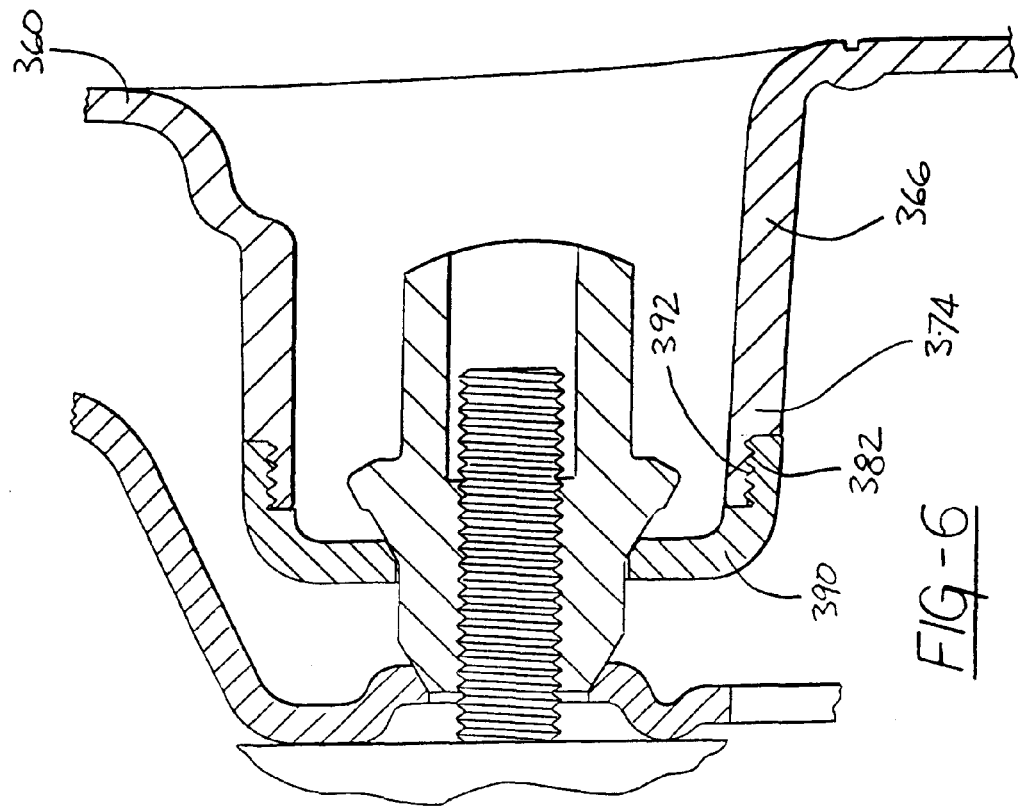
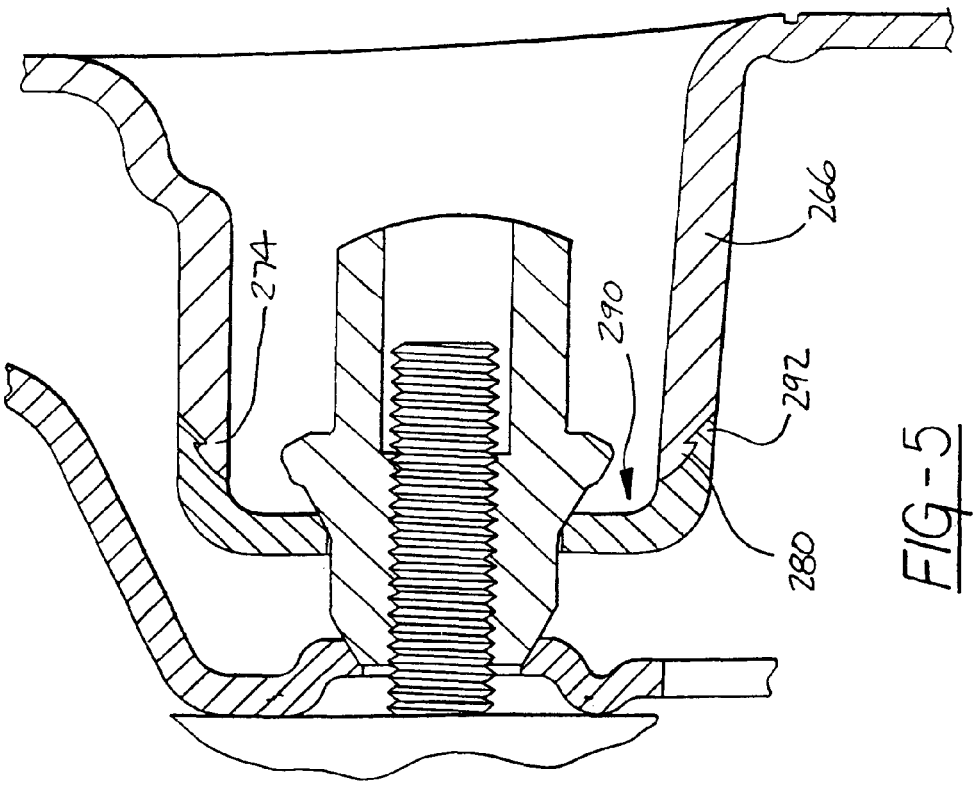

LUG NUT RETENTION SYSTEM FOR A CHROME-PLATED WHEEL COVER

BACKGROUND OF THE INVENTION

1. Field of the Invention

The present invention generally relates to plastic wheel covers for a vehicle wheel. More particularly, this invention relates to bolt-on wheel covers that are integrally retained to, but thermally isolated from, lug nuts of a vehicle wheel.

2. Description of the Prior Art

Wheel covers have been used on vehicle wheels for many decades for purposes of aesthetic design, reduction in drag coefficient, and for improvement of brake cooling. Wheel covers have been fastened to wheels with a variety of devices including clips, springs, and integral retaining features. In addition, traditional materials for forming wheel covers include steel and aluminum. Plastic, however, has increasingly been used in order to reduce cost and weight, and to increase design flexibility.

Use of "high-temperature" plastic for vehicle wheel covers is well known in the art. In contrast, use of "low-temperature" plastic is less known, but is becoming more popular because it can be chrome plated for aesthetic value. A popular technique for retaining a wheel cover to the wheel involves connecting the wheel cover to the lug nuts of the wheel. The lug nuts, however, tend to be prohibitively hot due to heat transfer generated from a brake component to which the lug nuts are indirectly connected. Under severe conditions, brake lining temperatures are known to exceed 1000° F. while wheel temperatures are known to exceed 500° F. Therefore, care must be taken not to subject the low-temperature cover to the hot lug nuts of the wheel. Accordingly, there are several different wheel covers having various lug nut retention devices to select from, that could be described as: cap retained, bolt-on, integral press-on, and retainer press-on wheel covers.

Cap retained covers involve a cover body that mounts to the wheel and includes lug towers that loosely circumscribe the lug nut or stud. A separate cap retainer interlockingly engages the lug nut or stud to sandwich an apical shoulder of the lug tower between the retainer and the wheel. Several examples include: U.S. Pat. No. 4,895,415 to Stay et al., U.S. Pat. No. 4,998,780 to Eshler, U.S. Pat. No. 5,181,767 to Hudgins et al., U.S. Pat. No. 5,667,281 to Ladouceur, and U.S. Pat. No. 5,842,749 to DiMarco. With some of these designs, the cover is spaced away from the wheel by the cap retainer. These designs, however, require use of several cap retainers thus adding to part count and assembly steps—thus increasing costs. Additionally, the cap retainers have been known to work loose and fall off, thereby resulting in loss of or damage to the wheel cover itself. Finally, the retainers have been known to slacken due to temperature creep, resulting in a slack condition between the cover and the wheel. This slack condition also results in noise generated by the loose wheel cover rattling against the wheel.

Bolt-on covers involve a cover body having open lug towers for mounting over lug studs on a wheel. Subsequently, a lug nut mounts to the lug stud to trap an apical shoulder of the lug tower therebetween. An example of this is illustrated in U.S. Pat. No. 5,520,445 to Toth. Here the apical shoulder of the lug tower comes in direct contact with the hot lug nut. In another embodiment, a skirt on the lug nut spaces the cover away from the lug nut. The skirt, however, is taught as a device for retaining the lug nut to the cover for disassembly purposes, and not for thermal isolating purposes. In fact, such skirts are typically metallic and therefore there is no reason to believe that the skirt provides any thermal insulation at all.

Integral press-on wheel covers typically involve a cover body provided with integral tubular extensions, or lug towers, each having an integral projection for engaging a shoulder of a lug nut. Several examples include: U.S. Pat. No. 4,382,635 to Brown et al., U.S. Pat. No. 4,707,035 to Kondo et al., U.S. Pat. No. 5,071,197 to Webster et al., and U.S. Pat. No. 5,163,739 to Stanlake. With this configuration, the wheel cover is aligned to the wheel and pressed thereto such that each lug tower expands open over each lug nut shoulder and snaps shut behind each shoulder to retain the cover to the wheel. Unfortunately, traditional integral press-on covers come in direct contact with the hot lug nuts and therefore necessitate use of only non-platable high-temperature plastic.

Finally, retainer press-on covers involve a cover body including lug towers each having an intermediate retainer therein for gripping a lug nut. For example, U.S. Pat. No. 4,842,339 to Roulinson addresses the problem of having to use a non-standard lug nut having a special bulge for engaging the wheel cover. Roulinson teaches use of an expandable ring within each lug tower for gripping a standard lug nut. Unfortunately, the expanding ring is metal and therefore conducts heat from the lug nut to the cover. In addition, the expanding ring is an extra part that adds part count and assembly time, thereby increasing costs.

Another example, as set forth in U.S. Pat. No. 5,249,845 to Dubost, is directed to the problem of difficulty in removing wheel covers from a wheel for servicing purposes. Dubost teaches use of an intermediate sliding sleeve retainer within each lug tower for a more compliant grip on the lug nut. Unfortunately, the sleeve adds to part count and assembly time, thereby increasing costs. In addition, the Dubost design involves moving parts instead of a more robust static state design. Further, Dubost does not teach use of a thermally insulating plastic for the sleeve.

Lastly, U.S. Pat. No. 5,297,854 to Nielsen et al., involves a plastic cover body having lug towers with tulip retainers fastened thereto for gripping the lug nuts. The tulip retainers expand open over the lug nut and collapse behind a shoulder on the lug nut for retention thereto. Also, Nielsen et al. is directed to the problem of poor grip of integral press-on architecture and does not teach thermal isolation of the cover body from hot wheel lugs. Unfortunately, each tulip retainer must be assembled to the cover body, thereby adding unwanted assembly time and expense. Additionally, Nielsen et al. appears to be applicable to only hub-style wheel covers and not full face style wheel covers. Full face style wheel covers are highly desirable and ordinarily require a more positive retention method, like the bolt-on retention configuration, to resist continual tension on the retaining area of the cover created by pre-load across the face of the cover. In addition, the Nielsen et al. retaining method is more susceptible to theft of the cover than the bolt-on configuration. Finally, Nielsen et al. also does not apply to a cover with open lug towers that permit display of decorative lug nuts.

Therefore, what is needed is a plastic wheel cover that overcomes the shortcomings of the prior art. Firstly, the cover should be primarily composed of chrome platable "low-temperature" plastic that is thermally isolated from the lug nuts. Secondly, the cover should have integral isolators that serve to isolate the cover from the lug nuts and that are easily assembled or are easily molded in place. Thirdly, the cover should include a robust retaining architecture to permit use of full-face wheel covers, enable open lug towers for display of decorative lug nuts, and provide better theft deterrence.

SUMMARY OF THE INVENTION

According to the present invention there is provided a plastic wheel cover composed of low-temperature plastic that is integrally retained on, but thermally isolated from the lug nuts of a wheel. The cover includes integral isolators that are easily assembled or are easily molded in place.

According to the present invention, a wheel cover retention system for a wheel having lug studs is provided. The retention system includes a wheel cover having a base with an outboard surface and an oppositely disposed inboard surface. The base also has lug towers formed integrally therein and projecting inboard from the inboard surface. The wheel cover also has isolators integrally fixed, coaxially and apically, to the lug towers. Each lug stud corresponds to and extends through each lug tower and each isolator. Lug nuts, each including a shoulder, are also provided. Each lug nut threading to each lug stud and fastens the wheel cover between the wheel and the lug nuts to pre-load the wheel cover against the wheel.

Further according to the present invention, a wheel assembly for a vehicle is provided. The wheel assembly includes a wheel having lug stud apertures and lug studs extending through the lug stud apertures. A wheel cover overlays at least a portion of the wheel and includes a base having an outboard surface and an oppositely disposed inboard surface. The base also has lug towers extending axially inward from the inboard surface, each terminating in an apical end and each having a passage therethrough. The wheel cover also includes isolators integrally fixed, coaxially and apically, to the apical end of each lug tower. The isolators thermally isolating the wheel cover from heat transfer through the lug studs that extend through the lug towers and isolators. Lug nuts engage the lug studs with each lug nut having a shoulder fastening each isolator between each lug nut and the wheel thereby pre-loading the wheel cover against the wheel.

Again, according to the present invention, a wheel cover is provided including a base having an outboard surface, an oppositely disposed inboard surface, and lug towers extending axially inward from the inboard surface. Isolators are integrally fixed to the lug towers to thermally isolate the base from hot lug nuts of a wheel.

Accordingly, it is an object of the present invention to provide a wheel cover that includes integrally fastened or molded-in isolators that thermally isolate a platable base of the wheel cover from high temperature lug nuts of a wheel.

It is another object to provide a wheel cover that can be bolted onto a vehicle wheel with at least one lug nut to deter theft of the wheel cover.

It is yet another object to provide a wheel cover that covers the full face of a vehicle wheel.

It is still another object to provide a wheel cover that permits display of decorative lug nuts.

It is a further object to provide a plastic wheel cover that is capable of being chrome plated.

It is yet a further object to provide a wheel cover that permits use of different length isolators to achieve different draw-down or pre-load across the face of the wheel cover.

These objects and other features, aspects, and advantages of this invention will become apparent after a reading of the following detailed description, appended claims, and accompanying drawings.

BRIEF DESCRIPTION OF THE DRAWINGS

FIG. 1 is a partial cross-sectional view of a vehicle wheel assembly;

FIG. 2 is an enlarged exploded cross-sectional view of the vehicle wheel assembly of FIG. 1 showing a preferred lug nut retention system;

FIG. 5 is an enlarged cross-sectional view of an isolator snapped onto a lug tower; and FIG. 6 is an enlarged cross-sectional view of an isolator threaded onto a lug tower.

DETAILED DESCRIPTION OF THE PREFERRED EMBODIMENT

Figure 4:
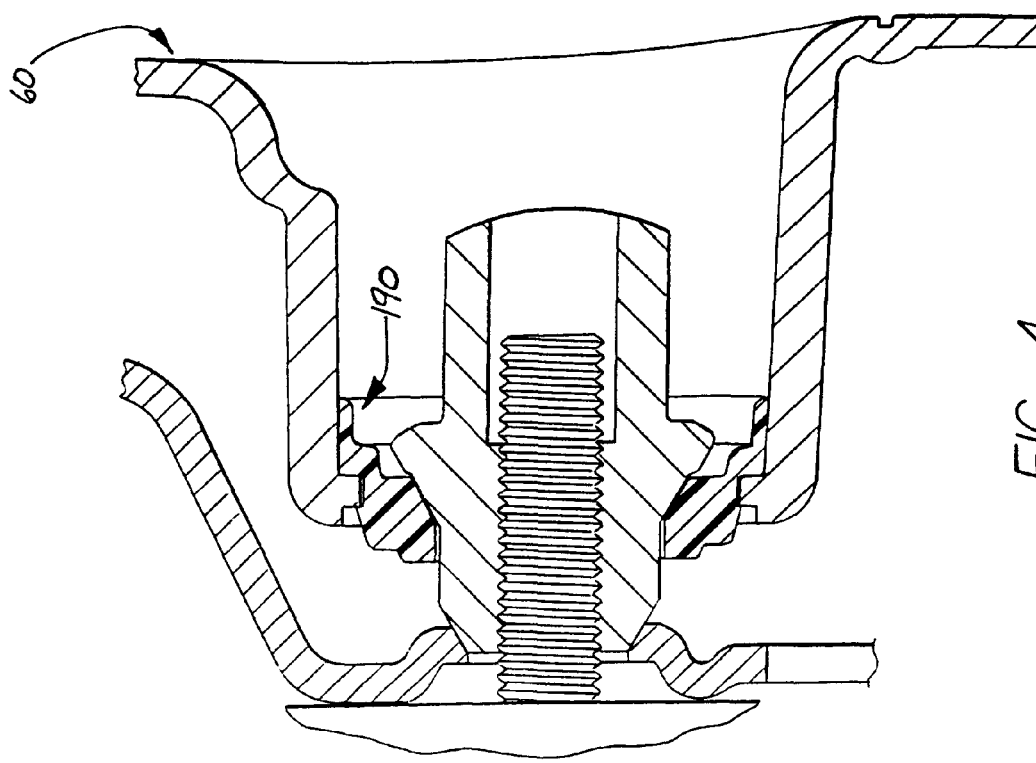
FIG. 4 is an enlarged cross-sectional view of another lug nut retention configuration.

Referring in detail to FIG. 1, the wheel cover retention system of the present invention is a wheel 20 that includes a hub 22 that receives lug studs 24 that extend axially outward from an axle flange 26, through a brake disc 28, and along an axis of rotation 30 of the wheel 20. As will be apparent to one skilled in the art, the wheel 20 may be composed of steel, an aluminum alloy, or any suitable composite material and is mounted on the lug studs 24 and an axle flange hub 32. Lug nuts 40 are secured on the lug studs 24 to retain the wheel 20 to the axle flange 26.

A wheel cover 60 according to the present invention is provided that includes a base portion 61 having an outboard surface 62 that provides aesthetic value, and an oppositely disposed inboard surface 64. The outboard surface 62 of the wheel cover 60 can be painted or plated, for example with an attractive chrome finish. A plurality of open tubular extensions, or lug towers 66, axially extend inward from the inboard surface 64 of the wheel cover 60. The wheel cover 60 may be made of any appropriate wheel cover material that can be injection molded, preferably from a chrome-platable plastic. Chrome-platable plastic is typically composed of a low-temperature plastic, such as polycarbonate/acrylonitrile-butadiene-styrene (PC/ABS).

Figure 3:
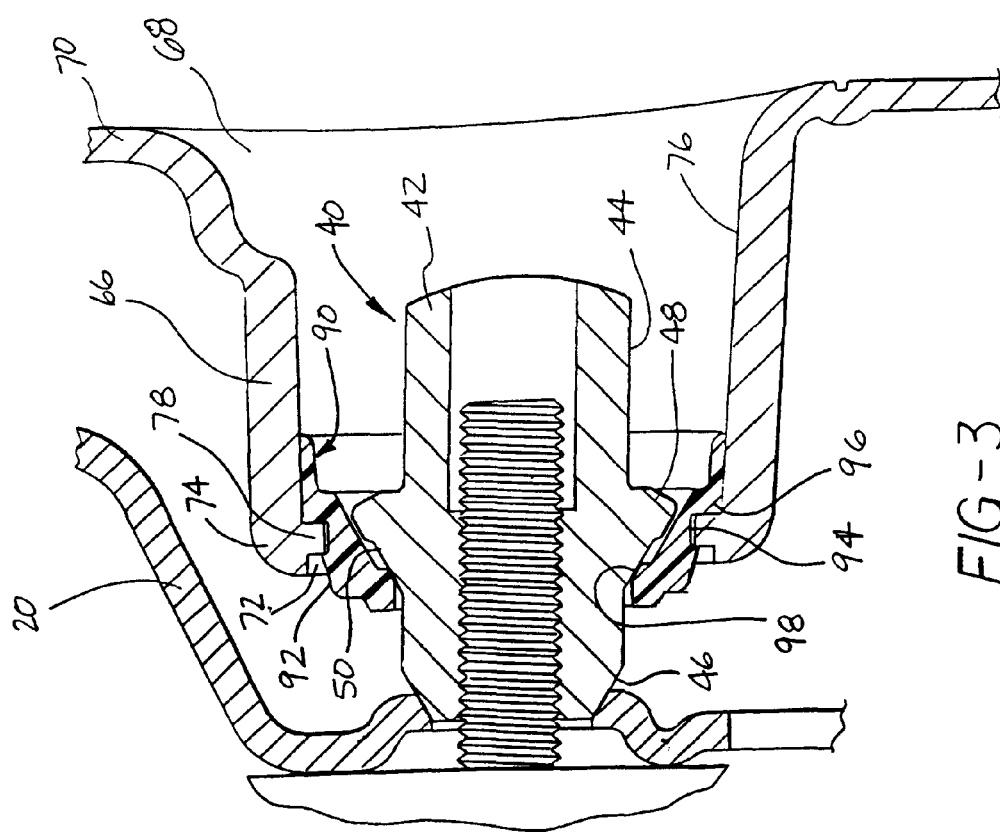
FIG. 3 is enlarged cross-sectional view of the lug nut retention system of FIG. 2, as assembled.

Referring now to FIGS. 2 and 3, each of the lug towers 66 has an outboard aperture 68 at an outboard end 70 and an inboard aperture 72 at an apical end 74. An inner passage 76 extends between the outboard and apical ends 70 and 74. At least one of the lug towers 66 has an interlocking feature such as a tongue, projection, or tab 78 of continuous or interrupted annulus, for interlocking with an annular groove 94 on the isolator 90.

The isolator 90 may be made of any appropriate material, but is preferably composed of a thermoset, such as PC/PBT produced from a compression molding, glass matte transfer molding, or bulk molding process. The isolator 90 has an external taper 92 to provide a gradual snap fit assembly to the tab 78 of the wheel cover 60. As described above, the isolator 90 also has an engagement feature such as the annular groove 94 for interlocking with the tab 78 of the lug tower 66 of the wheel cover 60. The annular groove 94 of the isolator 90 is axially bounded by the external taper 92 and a shoulder 96 on the wheel cover lug tower 66. The external taper 92 and shoulder 96 axially locate the isolator 90 to the wheel cover 60. The shoulder 96 also acts to pilot the isolator 90 within the inner passage 76 of the lug tower 66.

The lug nut 40 engages an internal taper 98 of the isolator 90 to locate, positively and axially, the wheel cover 60 to the lug nut 40 on the wheel 20. The lug nut 40 includes a head 42 and an outer annular surface 44 extending between the head 42 and a wheel-engaging surface 46. The outer annular surface 44 includes a flange 48 having an external taper 50 for engaging the internal taper 98 of the isolator 90 to provide positive axial positioning of the wheel cover 60 to the wheel 20. The isolator 90 may be pre-assembled to the wheel 20 to provide a one-piece wheel cover 60 for ease of assembly. The isolator 90 must be fixedly secured to at least one lug tower 66, but preferably, multiple isolators 90 are fixedly secured, one each, to multiple lug towers 66 for optimal retention. Finally, the positive axial positioning of the wheel cover 60 may be varied by using a thicker isolator 190, as shown in FIG. 4. Here, the isolator 190 is thicker in cross section to provide more drawdown or pre-load on the wheel cover 60.

Referring again to FIG. 1, drawdown is a measure of how much the wheel cover 60 is drawn inboard toward the wheel 20 as the lug nuts 40 are torqued down to pre-load the wheel cover 60 against the wheel 20. First, the wheel cover 60 is aligned with the wheel 20 such that each lug tower 66 circumscribes each lug stud 24, and only the wheel cover periphery locates against the wheel 20 in an initial state of rest—as exaggerated in phantom line. Then, the lug nuts 40 are torqued down on the lug studs 24 to engage the isolators 90 and thereby pull the lug towers 66 and the rest of the wheel cover 60 inboard toward the wheel 20, as indicated by the arrow A. The displacement of the wheel cover 60 toward the wheel 20 from the initial state of rest is defined as the drawdown on the wheel cover 60. This drawdown ensures constant positive axial engagement of the wheel cover periphery to the wheel 20 at all times, by imparting a pre-load across the wheel cover 60.

The wheel cover 60 requires drawdown to be induced during assembly to compensate for a loss of preload stress across the wheel cover 60 due to the effects of heat transfer from the brake disc 28. Accordingly, drawdown is needed to induce sufficient preload stress across the wheel cover 60 to keep the wheel cover periphery tight to the wheel 20 so that the wheel cover 60 will not rattle during vehicle operation. When the wheel cover 60 is pre-loaded beyond its natural state of rest —such as under a drawdown condition—it will tend to seek an alternative state of rest when heat is applied. In other words, the wheel cover 60 seeks to relieve the drawdown stress when heat is applied. Therefore, a target preload stress is designed in to the assembly of the wheel cover 60 to the wheel 20 that exceeds the amount of stress that the wheel cover 60 can relieve naturally due to thermal effects. For example, typical loss of preload stress in a plastic wheel cover 60 due to heat translates into approximately 3 mm of displacement of the wheel cover 60. Therefore, the amount of drawdown induced is typically engineered to be in the range of about 5 mm, thereby yielding a safety dimension of 2 mm.

Chrome plating a wheel cover 60 increases the stiffness of the wheel cover 60, thereby yielding a desired preload stress through less drawdown. Plastic wheel covers lack this increased stiffness, and therefore, require relatively more drawdown than chrome-plated wheel covers. Since painted wheel covers require more drawdown than a chrome-plated wheel cover, the thicker isolator 190 of FIG. 4 is employed to induce additional drawdown to achieve the desired target preload stress.

FIG. 5 illustrates an alternative isolator 290 that snap fits to an apical end 274 of a lug tower 266. Here the isolator 290 has an interlocking feature, or internal barb 292, that interlocks with an external barb 280 on the apical end 274 of the lug tower 266. The isolator 290 is pressed onto the apical end 274 of the lug tower 266. Likewise, FIG. 6 illustrates another alternative isolator 390 that threads to an apical end 374 of a lug tower 366. The isolator 390 includes internal threads 392 that mate to external threads 382 of the apical end 374 of the lug tower 366. As above, isolators having varying axial thicknesses may be used in combination with a single plastic wheel cover to achieve different drawdown for different applications.

In general, the retention system of the present invention provides a positive location of the wheel cover relative to the lug nuts and the wheel through an integrally fastened isolator having an internal taper that acts as stop against an external taper on the lug nuts. The isolator is composed of a high-temperature material to isolate the base of the wheel cover from the detrimental thermal effects of heat transfer from the brakes. Therefore, a chrome-platable low-temperature plastic wheel cover base may be retained on hot lug nuts of a standard wheel.

From the above, it can be appreciated that a significant advantage of the present invention is that the wheel cover includes the low-cost, functionality, and quality of a traditional one-piece wheel cover, and also includes the ability to be painted or chrome-plated.

Another advantage is that a common wheel cover may be used with different isolators to achieve different drawdown dimensions. This facilitates use of one common wheel cover that may be painted, thereby requiring relatively more drawdown than a chrome-plated wheel cover, or may be chrome-plated thereby requiring relatively less drawdown. Therefore, the expense of having to tool two wheel cover molds is avoided.

Yet another advantage is that the design of the present invention permits installation of full wheel covers, not just hub covers. Also, the lug towers may be open at either end to permit display of decorative lug nuts. Finally, this design promotes theft deterrence of the wheel cover by requiring removal of at least one lug nut to remove the entire wheel cover.

Still another advantage is that the isolator of the present invention is a relatively cheap and easy piece to manufacture compared with the tulip retainer of the Nielsen et al. reference that requires use of progressive die tooling to stamp the tulip. In addition, while the present invention does rely on continual tension across the face of the wheel cover, it does not rely on continual tension of the isolator for retention, as in the Nielsen et al. reference. Rather, the isolator is positively trapped between the lug nut and wheel cover in its natural state.

While the present invention has been described in terms of a preferred embodiment, it is apparent that other forms could be adopted by one skilled in the art. For example, the isolator may be insert molded to the wheel cover instead of integrally fastened. Additionally, the isolator may include a tab or tongue feature that interlocks with a groove feature on the lug tower to attach the isolator thereto. Finally, the wheel cover may include a quantity of isolators fewer in number than the number of correspondingly available lug nuts. For example, the wheel cover may include only three isolators and lug towers that attach to a wheel having five lug nuts. Accordingly, the scope of the present invention is to be limited only by the following claims.

What is claimed is:

1. A wheel cover for mounting to a wheel of a vehicle, said wheel cover comprising:

a wheel cover base having an outboard surface, an oppositely disposed inboard surface, and a plurality of elongated tubular extensions extending axially in a direction away from said inboard surface, each of said plurality of elongated tubular extensions having an apical end and an aperture therethrough; and means for locating and thermally isolating said wheel cover base with respect to said wheel, said means for locating and thermally isolating being mounted to each said apical end of said plurality of elongated tubular extensions;

whereby a predetermined preload is established between the periphery of said wheel cover base and said wheel such that the periphery of said wheel cover base at all times maintains a surface to surface contact with said wheel, and further whereby said means for locating and thermally isolating is maintained a predetermined distance from said wheel such that each said apical end is thermally isolated from heat generated by a brake system of said vehicle which is conducted to lug nuts and lug nut studs of the vehicle when said wheel cover is assembled to said wheel of the vehicle.

2. The wheel cover as claimed in claim 1, wherein said wheel cover base comprises a platable plastic material.

3. The wheel cover as claimed in claim 2, wherein said wheel cover base comprises a PC/ABS material.

4. The wheel cover as claimed in claim 1, wherein said means for locating and thermally isolating comprises a plurality of thermal isolators composed of a thermoset material.

5. The wheel cover as claimed in claim 1, wherein said means for locating and thermally isolating is correspondingly molded in place to said plurality of elongated tubular extensions.

6. The wheel cover as claimed in claim 1, wherein said means for locating and thermally isolating is correspondingly press fit to said plurality elongated tubular extensions.

7. The wheel cover as claimed in claims 1, wherein said means for locating and thermally isolating comprises a tapered tab and a shoulder, each of said plurality of elongated tubular extensions includes a passage therethrough and a portion projecting into said passage, said tapered tab piloting through said passage to entrap said projection between said tapered tab and said shoulder.

8. The wheel cover as claimed in claim 1, wherein said means for locating and thermally isolating is correspondingly threaded to each elongated tubular extension of said plurality of elongated tubular extensions.

9. A wheel cover adapted to be mounted to a wheel, said wheel cover comprising:

a wheel cover base having an outboard surface, an oppositely disposed inboard surface, and a plurality of elongated tubular extensions formed integrally therewith, said plurality of elongated tubular extensions extending in a direction away from said inboard surface, each elongated tubular extension of said plurality of elongated tubular extensions terminating in an apical end having an aperture therethrough;

at least one thermal isolator member integrally mounted in said apical end of at least one of said plurality of elongated tubular extensions; and means for mounting said at least one thermal isolator member in a predetermined location in said apical end of said at least one of said plurality of elongated tubular extensions;

whereby upon assembly of said wheel cover to said wheel a predetermined preload is established between the periphery of said wheel cover base and said wheel such that the periphery of said wheel cover base maintains a surface to surface contact with said wheel;

further whereby said at least one thermal isolator member and said apical end of each elongated tubular extension of said plurality of elongated tubular extensions is maintained a predetermined distance from said wheel such that said apical end of each elongated tubular extension of said plurality of elongated tubular extensions is thermally isolated from heat generated by a brake system of a vehicle which is conducted to said lug nuts when said wheel cover is assembled to said wheel.

10. The wheel cover as claimed in claims 9, wherein at least one of said lug nuts fastens said wheel cover to said wheel.

11. The wheel cover as claimed in claim 10, wherein each of said lug nuts includes a shoulder thereon, said shoulder of each of said lug nuts retaining said at least one thermal isolator member with respect to said wheel, whereby the periphery of said wheel cover is preloaded against said wheel to ensure constant contact of the periphery of said wheel cover to said wheel.

12. A wheel assembly for a vehicle, said wheel assembly comprising:

a wheel including a plurality of lug stud apertures therethrough;

a plurality of lug studs extending through said plurality of lug stud apertures of said wheel;

a wheel cover having an outboard surface, an oppositely disposed inboard surface, and a plurality of elongated tubular extensions extending axially inward from said inboard surface, each of said plurality of elongated tubular extensions having an apical end and a passage therethrough;

means for establishing a predetermined preload between said wheel cover and said wheel, said predetermined preload being applied proximate a radially outer portion of said wheel cover and said wheel, said predetermined preload being maintained notwithstanding thermal creeping of said wheel cover;

a plurality of thermal isolators integrally fixed coaxially to said plurality of elongated tubular extensions a predetermined distance for spacing said plurality of elongated tubular extensions from said wheel and for thermally isolating said wheel cover from heat transfer through said plurality of lug studs, said plurality of lug studs extending through said passage of said apical end of said plurality of elongated tubular extensions and through said plurality of thermal isolators; and a plurality of lug nuts engaging said plurality of lug studs, said plurality of lug nuts each including a shoulder thereon for retaining each thermal isolator of said plurality of thermal isolators with respect to said wheel whereby each isolator of said plurality of thermal isolators is spaced away from said outboard surface of said wheel cover such that a radially outer portion of said wheel cover is preloaded against said wheel to ensure constant contact of said radially outer portion of said wheel cover to said wheel.

13. In combination with a vehicle wheel of the type having a plurality of circumferentially spaced lug nuts, and a plastic wheel cover of the type having an outboard surface, an oppositely disposed inboard surface, and a plurality of elongated tubular extensions circumferentially spaced and extending in a direction away from said inboard surface of said plastic wheel cover, said plurality of elongated tubular extensions each having an apical end and an aperture therethrough, wherein the improvement comprises:

at least one thermal isolator member integrally mounted to said apical end of said plurality of elongated tubular extensions; and means for establishing a preload on the periphery of said plastic wheel cover and maintaining a predetermined distance between said apical end of each elongated tubular extension of said plurality of elongated tubular extensions and said outboard wheel surface when said plastic wheel cover is assembled to said vehicle wheel.

14. In combination with a vehicle wheel of the type having a plurality of circumferentially spaced lug nuts, and a plastic wheel cover of the type having an outboard surface, an oppositely disposed inboard surface, and a plurality of elongated tubular extensions circumferentially spaced and extending in a direction away from said inboard surface of said plastic wheel cover, said plurality of elongated tubular extensions each having an apical end and an aperture therethrough, wherein the improvement comprises:

at least one thermal isolator member integrally mounted to said apical end of said plurality of elongated tubular extensions; and means for spacing each said apical end of said plurality of elongated tubular extensions a predetermined distance from said outboard surface of said wheel upon assembly of said plastic wheel cover to said wheel, whereby said plastic wheel cover is thermally isolated by said means for spacing from heat generated by a brake system of the vehicle which is conducted to said plurality of circumferentially spaced lug nuts when said plastic wheel cover is assembled to said vehicle wheel.

* * * * *

UNITED STATES PATENT AND TRADEMARK OFFICE
CERTIFICATE OF CORRECTION

| | |
|---|---|
| PATENT NO. | : 6,913,322 B1 |
| APPLICATION NO. | : 09/522023 |
| DATED | : July 5, 2005 |
| INVENTOR(S) | : Kirk R. Allen |

It is certified that error appears in the above-identified patent and that said Letters Patent is hereby corrected as shown below:

In Column 2, Line 54, kindly delete "pre-load" and insert --preload--.

In Column 3, Line 2, kindly delete "full-face" and insert --fullface--.

In Column 3, Line 10, kindly delete "from" and insert --from,--.

In Column 3, Line 11, before "isolators" kindly insert --thermal--.

In Column 3, Line 19, before "isolator" kindly insert --thermal--.

In Column 3, Line 21, before "isolator." kindly insert --thermal--.

In Column 3, Line 23, kindly delete "threading" and insert --threads--.

In Column 3, Line 24, kindly delete "pre-load" and insert --preload--.

In Column 3, Line 35, before "isolators" kindly insert --thermal--.

In Column 3, Line 37, before "isolators" kindly insert --thermal--.

In Column 3, Line 37, kindly delete "isolating" and insert --isolate--.

In Column 3, Line 39, before "isolators." kindly insert --thermal--.

In Column 3, Line 40, before "isolator" kindly insert --thermal--.

In Column 3, Line 41, kindly delete "pre-loading" and insert --preloading--.

In Column 3, Line 46, kindly delete "Isolators" and insert --Thermal insolators--.

In Column 3, Line 51, before "isolators" kindly insert --thermal--.

In Column 3, Line 51, kindly delete "thermally".

In Column 3, Line 63, before "isolators" kindly insert --thermal--.

In Column 3, Line 64, kindly delete "pre-load" and insert --preload--.

In Column 4, Fig. 3., Line 11, after "is" kindly insert --an--.

UNITED STATES PATENT AND TRADEMARK OFFICE
CERTIFICATE OF CORRECTION

| | |
|---|---|
| PATENT NO. | : 6,913,322 B1 |
| APPLICATION NO. | : 09/522023 |
| DATED | : July 5, 2005 |
| INVENTOR(S) | : Kirk R. Allen |

It is certified that error appears in the above-identified patent and that said Letters Patent is hereby corrected as shown below:

In Column 4, Fig. 5, Line 15, after "of" kindly delete "an" and insert --a thermal--.

In Column 4, Fig. 6, Line 17, after "of" kindly delete "an" and insert --a thermal--.

In Column 4, Line 53, kindly delete ""the" and insert --a thermal--.

In Column 4, Line 54, before "isolator" kindly insert --thermal--.

In Column 4, Line 57, before "isolator" kindly insert --thermal--.

In Column 4, Line 60, before "isolator" kindly insert --thermal--.

In Column 4, Line 63, before "isolator" kindly insert --thermal--.

In Column 4, Line 65, before "isolator" kindly insert --thermal--.

In Column 4, Line 67, before "isolator" kindly insert --thermal--.

In Column 5, Line 1, before "isolator" kindly insert --thermal--.

In Column 5, Line 7, before "isolator" kindly insert --thermal--.

In Column 5, Line 9, before "isolator" kindly insert --thermal--.

In Column 5, Line 11, before "isolator" kindly insert --thermal--.

In Column 5, Line 12, before "isolators" kindly insert --thermal--.

In Column 5, Line 15, before "isolator" kindly insert --thermal--.

In Column 5, Line 16, before "isolator" kindly insert --thermal--.

In Column 5, Line 17, kindly delete "pre-load" and insert --preload--.

In Column 5, Line 21, kindly delete "pre-load" and insert --preload--.

In Column 5, Line 27, before "isolators" kindly insert --thermal--.

In Column 5, Line 35, kindly delete "pre-load" and insert --preload--.

UNITED STATES PATENT AND TRADEMARK OFFICE
CERTIFICATE OF CORRECTION

| | |
|---|---|
| PATENT NO. | : 6,913,322 B1 |
| APPLICATION NO. | : 09/522023 |
| DATED | : July 5, 2005 |
| INVENTOR(S) | : Kirk R. Allen |

It is certified that error appears in the above-identified patent and that said Letters Patent is hereby corrected as shown below:

In Column 5, Line 43, kindly delete "pre-loaded" and insert --preloaded--.

In Column 5, Line 53, kindly delete "3 mm" and insert --3-mm--.

In Column 5, Line 55, kindly delete "5 mm," and insert --5-mm,--.

In Column 5, Line 56, kindly delete "2 mm." and insert --2-mm.--.

In Column 5, Line 62, kindly delete "a".

In Column 5, Line 63, before "isolator" kindly insert --thermal--.

In Column 5, Line 66, before "isolator" kindly insert --thermal--.

In Column 5, Line 67, before "isolator" kindly insert --thermal--.

In Column 6, Line 3, before "isolator" kindly insert --thermal--.

In Column 6, Line 5, before "isolator" kindly insert --thermal--.

In Column 6, Line 6, before "isolator" kindly insert --thermal--.

In Column 6, Line 8, before "isolators" kindly Insert --thermal--.

In Column 6, Line 15, before "isolator" kindly insert --thermal--.

In Column 6, Line 15 after "as" kindly insert --a--.

In Column 6, Line 16, before "isolator" kindly insert --thermal--.

In Column 6, Line 28, before "isolators" kindly insert --thermal--.

In Column 6, Line 48, before "isolator" kindly insert --thermal--.

In Column 6, Line 50, before "isolator" kindly insert --thermal--.

In Column 6, Line 54, before "isolator" kindly insert --thermal--.

In Column 6, Line 55, before "isolator" kindly insert --thermal--.

UNITED STATES PATENT AND TRADEMARK OFFICE
CERTIFICATE OF CORRECTION

PATENT NO.        : 6,913,322 B1
APPLICATION NO.   : 09/522023
DATED             : July 5, 2005
INVENTOR(S)       : Kirk R. Allen It is certified that error appears in the above-identified patent and that said Letters Patent is hereby corrected as shown below:

In Column 6, Line 57, before "isolator" kindly insert --thermal--.

In Column 6, Line 58, before "isolators" kindly insert --thermal--.

In Column 6, Line 60, before "isolators" kindly insert --thermal--.

In Column 8, Claim 10, Line 14, kindly delete "claims" and insert --claim--.

In Column 9, Claim 13, Line 5, after "end of" kindly insert --each one of--.

In Column 10, Claim 14, Line 5, after "end of" kindly insert --each of one--.

In Column 10, Claim 14, Line 6, kindly delete "and".

Signed and Sealed this

Twenty-third Day of October, 2007

JON W. DUDAS
*Director of the United States Patent and Trademark Office*